(12) United States Patent
Fan et al.

(10) Patent No.: US 8,902,288 B1
(45) Date of Patent: Dec. 2, 2014

(54) PHOTO-IMAGE-BASED 3D MODELING SYSTEM ON A MOBILE DEVICE

(75) Inventors: Zhe Fan, Boulder, CO (US); Mark Limber, Boulder, CO (US); Brian Gammon Brown, Longmont, CO (US); Tilman Reinhardt, Woodside, CA (US); Matthew Robert Simpson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 653 days.

(21) Appl. No.: 13/162,218

(22) Filed: Jun. 16, 2011

(51) Int. Cl.
*H04N 13/00* (2006.01)

(52) U.S. Cl.
USPC ............. 348/46; 348/42; 348/43; 348/44; 348/45; 348/47; 348/48; 348/49; 348/50; 348/51; 348/52; 348/53; 348/54; 348/55; 348/56; 348/57; 348/58; 348/59; 348/60; 345/419; 345/420; 340/905; 455/41.2

(58) Field of Classification Search
USPC ............. 348/42–60; 345/419, 420; 340/905; 455/41.2
See application file for complete search history.

(56) References Cited

U.S. PATENT DOCUMENTS

| | | | |
|---|---|---|---|
| 7,193,633 B1 * | 3/2007 | Reinhardt et al. | 345/420 |
| 2009/0290759 A1 * | 11/2009 | Stevens et al. | 382/106 |
| 2010/0105325 A1 * | 4/2010 | Halla et al. | 455/41.2 |
| 2012/0007854 A1 * | 1/2012 | Cho | 345/419 |
| 2012/0218125 A1 * | 8/2012 | Demirdjian et al. | 340/905 |

OTHER PUBLICATIONS

"Google Building Maker", http://en.wikipedia.org/wiki/Google_Building_Maker, last modified Mar. 23, 2011, downloaded Apr. 7, 2011, pp. 1-6.
"Building Maker conceptsz—SketchUp Help", http://sketchup.google.com/support/bin/answer.py?h1=en&answer=153766, last modified Mar. 20, 2011, downloaded Apr. 7, 2011, pp. 1-3.
"Selecting a specific location—SketchUp Help", http://sketchup.google.com/support/bin/answer.py?answer=154057, last modified Mar. 20, 2011, downloaded Apr. 7, 2011, pp. 1-3.
"Creating a one-block building—SketchUp Help", http//sketchup.google.com/support/bin/answer.py?answer=154059, last modified Mar. 20, 2011, downloaded Apr. 7, 2011, pp. 1-4.
"Previewing your building—SketchUp Help", http://sketchup.google.com/support/bin/answer.py?answer=154060, last modified Mar. 20, 2011, downloaded Apr. 7, 2011, pp. 1-2.
"Signing into the 3D Warehouse—SketchUp Help", http://sketchup.google.com/support/bin/answer.py?answer-154061, last modified Mar. 20, 2011, downloaded Apr. 7, 2011, p. 1
"Saving and applying photos to a building—SketchUp Help", http://sketchup.google.com/support/bin/answer.py?answer-154062, last modified Mar. 20, 2011, downloaded Apr. 7, 2011, p. 1
"Creating a multi-block building—SketchUp Help", http://sketchup.google.com/support/bin/answer.py?answer-154064, last modified Mar. 20, 2011, downloaded Apr. 7, 2011, pp. 1-6.

* cited by examiner

*Primary Examiner* — Dave Czekaj
*Assistant Examiner* — Shanika Brumfield
(74) *Attorney, Agent, or Firm* — Dority & Manning, P.A.

(57) ABSTRACT

A system that runs in web browsers of mobile devices that allows mobile users to take photos of building exteriors and interiors or other real world objects, upload photos, share photos with others, and use the photo images to model the 3D models with the system's image-based modeling interface.

20 Claims, 12 Drawing Sheets

PHOTO-IMAGE-BASED 3D MODELING SYSTEM ON A MOBILE DEVICE

BACKGROUND

1. Field of the Invention

This field is generally related to the use of photographic information in conjunction with a simulated three-dimensional (3D) environment.

2. Related Art

Three-dimensional modeling tools and other computer-aided design (CAD) tools enable users to define three-dimensional models, such as a three-dimensional model of a building. Photographic images of the building may be available from, for example, satellite, aerial, vehicle-mounted street-view and user cameras. By texture mapping photographs of the buildings onto the three-dimensional models with photogrammetry algorithms, it becomes possible to use multiple photographs to create a visually appealing three-dimensional model.

Mobile devices with integrated cameras represent a valuable source of image data. The potential value of the image data is increased considerably because the image data may be associated with camera model information including location and orientation data from a location sensor, such as a GPS sensor.

BRIEF SUMMARY

Embodiments relate to using photographs, camera model information, and user input from mobile devices to create and navigate image-based three-dimensional models.

In a first embodiment, a computer-implemented method is provided for altering a three-dimensional model based on a set of two-dimensional images at a mobile device including a first camera. The computer-implemented method includes several stages, from (a) to (g). Stage (a) includes capturing, with the first camera, a local photographic image with a first field of view. Stage (b) includes detecting, using a location sensor coupled to the mobile device, a first location and a first orientation of the first camera when the local photograph was captured in (a), wherein a first camera model includes the first location and the first orientation. Stage (c) includes sending a request to a server, separate from the mobile device, for an additional photographic image captured from a second camera remote from the mobile device, the additional photographic image having a second field of view overlapping with the first field of view. Stage (d) includes receiving, from the server, the additional photographic image and a second camera model including a location and an orientation of the second camera when the additional photographic image was captured. Stage (e) includes receiving a user constraint input by a user, the user constraint associating a position on the local photographic image with a position on the three-dimensional model. Stage (f) includes applying a photogrammetry algorithm to alter the three-dimensional model based, at least in part on, the first and second camera models and the one or more user constraints. Stage (g) includes determining whether the user wants to add more constraints, and, if so, repeating stages (e) and (f).

Other embodiments describing systems and computer readable medium for altering a three-dimensional model based on a set of two-dimensional images at a mobile device including a first camera are also disclosed.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

As mentioned above, many mobile devices provide camera and location detection capabilities. Embodiments take maximum advantage of the information provided by a mobile device for image-based three-dimensional modeling. Particularly, embodiments use photographic data, camera model information, and user input to help the user in both constructing the model and in navigating the model.

Figure 1:
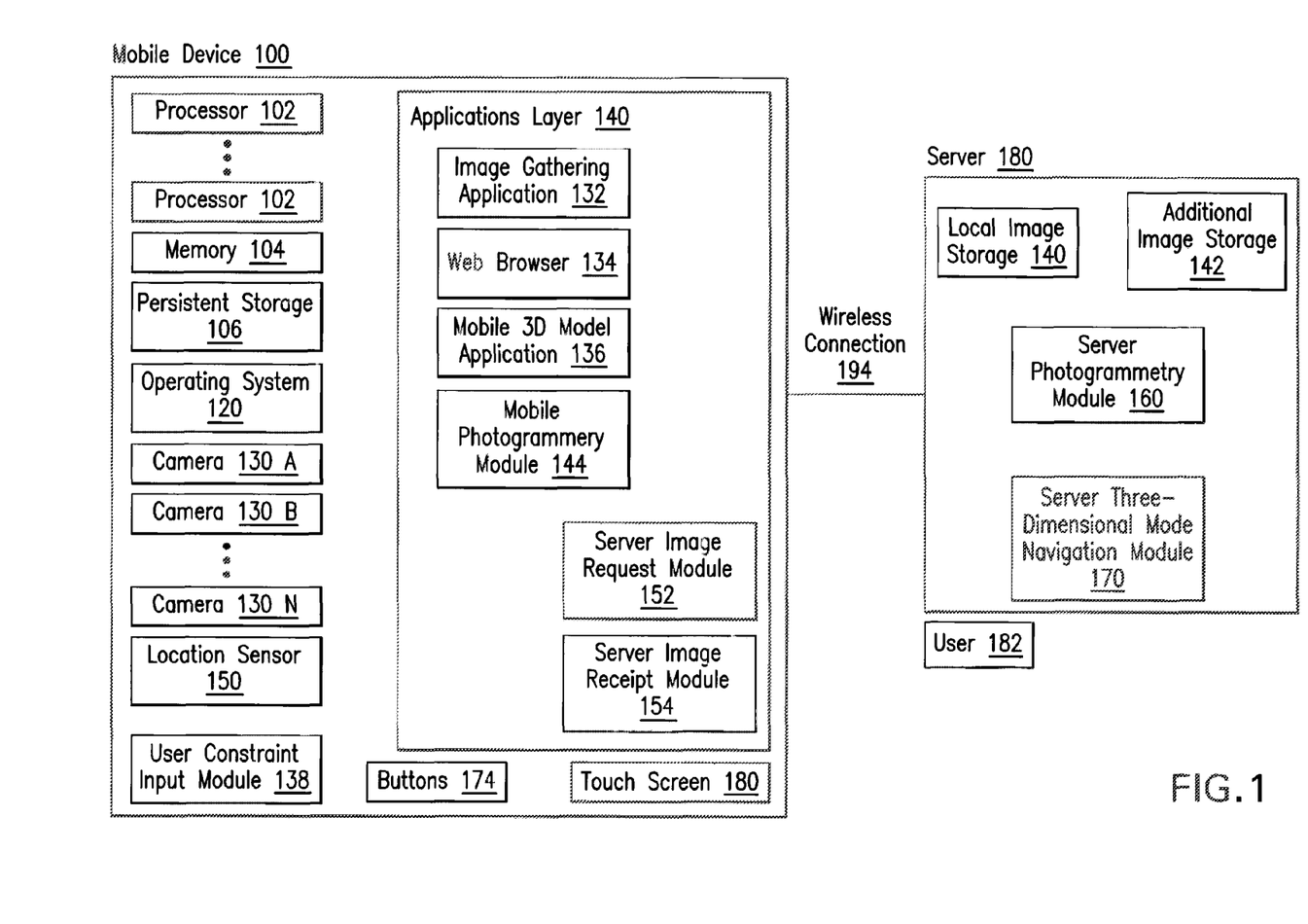
FIG. 1 is a diagram showing an exemplary mobile device for constructing three-dimensional models, as in an embodiment.

FIG. 1 is a diagram showing an exemplary mobile device for constructing three-dimensional models, as in an embodiment. In embodiments, a system provides for using a mobile device 100 to alter a three-dimensional model of an environment.

Mobile device 100, in general, will be a portable electronic device with one or more processors 102, a memory 104, a persistent storage 106, one or more cameras 130A, 130B . . . 130N, and a touch screen 180 and buttons 184 which allows a user 182 to access and control mobile device 100.

Many types of electronic devices may serve as mobile device 100. Such devices may include handheld devices, such as cell phones, smartphones, PDAs, gaming consoles, music players, video players, and so on. Other, slightly larger mobile devices such as tablets, GPS devices, and so on may also be used in certain embodiments.

Mobile device 100 runs an operating system 120 that coordinates the relationship between the software and hardware components of the mobile device. A system bus (not shown) may interconnect the various hardware components of mobile device 100. Alternatively, any hardware infrastructure that allows the various components of mobile device 100 to communicate with each other may be used in embodiments in lieu of a system bus.

While these various features of mobile device 100 have been set forth so as to characterize the mobile device and provide for different hardware aspects of various exemplary system embodiments, it is to be noted that embodiments need not incorporate all of these features and some may clearly be implemented in a variety of ways. For example, persistent storage may be implemented as a hard drive in some embodiments, flash memory in other embodiments, or may not be present in other embodiments.

Embodiments process information with respect to the three-dimensional model by using a front-end and a back-end. The front-end may run, for example, in a web browser 134 of the mobile device, or in a dedicated image gathering application 132 on the mobile device. The user can take photos, such as of exteriors or interiors of buildings or other objects, and then use an mobile 3D model application 136 at mobile device 100 to create the three-dimensional building or three-dimensional objects. The front-end includes the functionality that operates at mobile device 100, where user 182 interacts directly with the local environment of mobile device 100 and alters a 3D model using mobile 3D model application 136.

In mobile 3D model application 136, the user only needs to associate two-dimensional constraints on the photo images to match the photos with the geometry. The association, is discussed in greater detail below in association with FIG. 9. The textured three-dimensional models are automatically constructed with a photogrammetry solver that texture maps the photo image onto the surfaces of the 3D model. The photogrammetry may be performed at the front-end in mobile photogrammetry module 144 (see FIG. 1B), or at the back-end in server photogrammetry module 160. Whichever photogrammetry module is used, it is used in conjunction with mobile 3D model application 136 to provide data that helps mobile 3D model application 136 display surfaces in the model with photographs appropriately texture-mapped onto them. While mobile photogrammetry mobile 144 is shown as separate from mobile 3D model application 136, in other embodiments it may be included as part of mobile 3D model application 136.

Mobile device 100 is also generally connected to a back-end, which may, for example, be a server 180 that is connected over a wireless connection 194 to mobile device 100. The back-end uses the enhanced processing and storage capabilities of server 180 to host enhanced capabilities that user 182 can access remotely using mobile device 100. Server 180 includes a number of modules that organize and manipulate the data provided by mobile device 100 and uses them in combination with other sources of data to provide support for the three-dimensional model. For example, server 180 may include local image storage 140 to store and organize photographs that the user takes locally, as well as additional image storage 142 to store and organize photographs from other sources. Additional image storage 142 may include shared photos from other users, as well as information from sources such as satellites, aerial photography, and photography from land vehicles.

Local image storage 140 and additional image storage 142 are connected within server 180 to a server photogrammetry module 160. Server photogrammetry module 160 takes the two-dimensional image information and uses an appropriate algorithm to texture map the two-dimensional image information onto the three-dimensional solid. At server 180, a server three-dimensional mode navigation module 170 interacts with the information provided by server photogrammetry module 160 to provide the user with access to a three-dimensional interactive experience that reflects a simulation of the environment that the user has characterized by mapping images onto surfaces.

It is to be noted that while in one embodiment, the photogrammetry is performed at server 180 by combining local imagery from mobile device 100 with images from additional image storage 142, another embodiment may provide that the image gathering application 132 or the web browser 134 at mobile device 100 may retrieve images from additional image storage 142 wirelessly or simply use a set of images that has been obtained locally, that the image gathering application 132 or web browser 134 may provide photogrammetry locally at mobile photogrammetry module 144 (see FIG. 1B) the functionality of server photogrammetry module 160 and server three-dimensional mode navigation module 170 locally to the mobile device at mobile 3D model application 136.

As mentioned above, FIG. 1 further illustrates a mobile photogrammetry module 144, user constraint module 138, a server image request module 152, and a server image receipt module 154. Mobile photogrammetry module 144 carries out photogrammetry tasks at mobile device 100.

User constraint input module 138 enables user 182, using one or both of buttons 174 and touch screen 180, to input constraints to determine the three-dimensional model from two-dimensional images using photogrammetry. Each constraint indicates that a position on a two-dimensional photographic image corresponds to a position on a three-dimensional model.

In embodiments, altering the three-dimensional model may include using user constraint input module 138 to add additional user constraints by mapping new user constraints to positions on the three-dimensional model, or moving the user constraints to new positions on the three-dimensional model. Altering the three-dimensional model can include changing the geometry of the three-dimensional model based on the constraints.

Server image request module 152 initiates downloads of remote images for use by mobile photogrammetry module 144, and server image receipt module 154 receives the content of the remote images.

Furthermore, the user can upload the photos to the back-end and share photos with other users to let them model the 3D buildings or objects. When modeling, users can add three-dimensional primitives. User constraint input module 138 allows association of images with constraints with respect to the three-dimensional primitives to facilitate the photogrammetry. This capability results in a community in which modelers can help each other to gain photo images for modeling the real world in 3D.

Each of the constituent parts of the front-end and back-end may be implemented in hardware, software, firmware, or any combination thereof. Furthermore, each of the information storage parts of the front-end and back-end may be stored in any type of structured memory, including a persistent memory. In examples, such a persistent memory may be implemented as a database, including a relational database.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Computer-readable medium embodiments may include any physical medium which is capable of encoding instructions that may subsequently by used by a processor to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible, persistent storage that can serve in the role of providing instructions to a processor may be used to store the instructions in these embodiments.

Overview of the Method

Figure 2:
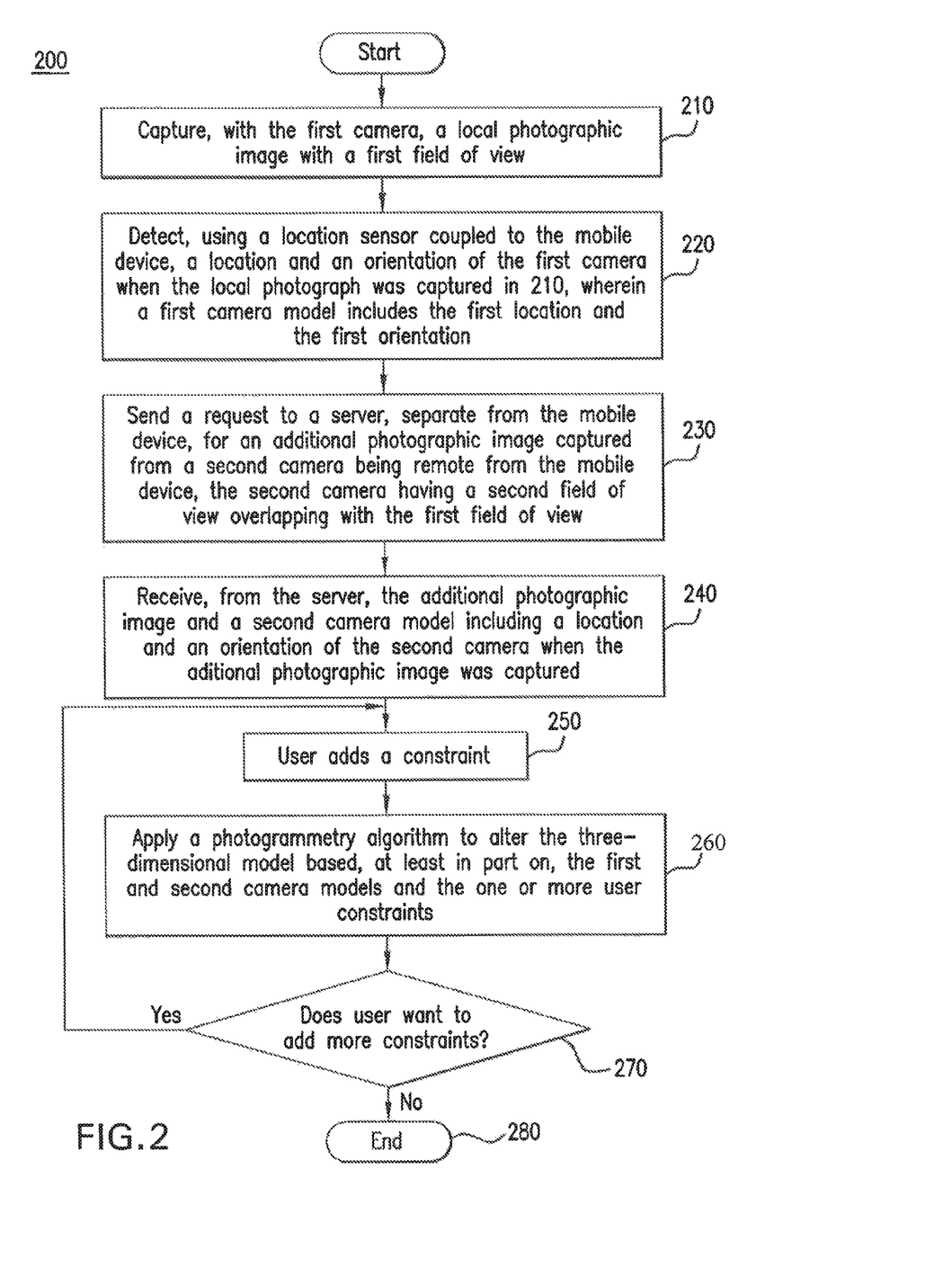
FIG. 2 is a flowchart showing a method for using a mobile device to provide photography, camera models, and user input that allow the user to create a three-dimensional model.

FIG. 2 is a flowchart of a method 200 using a mobile device to provide photography, camera models, and user input that allow the user to create and interact with a three-dimensional model. Method 200 enables construction of a three-dimensional model based on a set of two-dimensional images at a mobile device including a first camera. Method 200 includes several stages, from 210 to 270. The method presented here reflects the embodiment in which the user may add an arbitrary number of constraints, and other embodiments may include constraints associated with one local image and one additional image. While for clarity various stages are described with respect to components of system 100, a person of ordinary skill in the art would recognize that method 200 may be used in other contexts.

Stage 210 includes capturing, with the first camera, a local photographic image with a first field of view. Stage 210 may be carried out using first camera 130A and image gathering application 132.

Stage 220 includes detecting, using a location sensor coupled to the mobile device, a first location and a first orientation of the first camera when the local photograph was captured in 210. The first location and the first orientation may be included in a first camera model. In an illustrative example, stage 220 may be carried out using first camera 130A and location sensor 150.

Stage 230 includes sending a request to a server, separate from the mobile device, for an additional photographic image captured from a second camera. The second camera may be remote from the mobile device, and the additional photographic image may have a second field of view overlapping with the first field of view. Stage 230 may be carried out using wireless connection 194, server 180, server image request module 152, and additional image storage 142. In an example, stage 230 may involve retrieving other images geocoded with a predefined radius of the location detected from location sensor 150.

Stage 240 includes receiving from the server the additional photographic image and a second camera model. The second camera model may include a location and an orientation of the second camera when the additional photographic image was captured. Stage 240 may be carried out using wireless connection 194, server 180, server image receipt module 154, and additional image storage 142.

Stage 250 includes receiving a user constraint input from a user. The user constraint may be associated with a position on the local photographic image with a position on the three-dimensional model. Stage 250 may be carried out using image gathering application 132 and user constraint input module 138.

Stage 260 includes applying a photogrammetry algorithm to alter the three-dimensional model based, at least in part on, the first and second camera models and the one or more user constraints. Stage 260 may be carried out at server photogrammetry module 160 and server three-dimensional mode navigation module 170, or alternatively locally to mobile device 100 at mobile photogrammetry module 144 and mobile 3D model application 136. The photogrammetry process is discussed in greater detail below.

Stage 270 includes determining whether the user wants to put more constraints, and if so, repeating stages 250 and 260. Stage 270 may be carried out using user constraint input module 138.

The computer-implemented method offers several advantages over prior approaches to 3D modeling. One advantage is that it facilitates easy integration of images acquired using cameras local to a mobile device into a 3D modeling environment. Embodiments are designed to allow users to take pictures of their surroundings and integrate them into 3D models with a minimum of effort. Another advantage is that it obtains and associates camera model data including location and orientation information with the local photographs, thereby providing initial information to help incorporate the photographs into the model. Current 3D modeling technologies do not use location information, but the location information is used by embodiments to help facilitate the process of setting constraints. Because embodiments have camera model information, this information allows embodiments to provide users with an initial estimate of where constraints should go, saving the user time and effort. The method also facilitates combining local and additional photography, so that multiple sources can easily be used to provide the most versatile and wide-ranging set of photographs possible.

Constructing the Model

Figure 3:
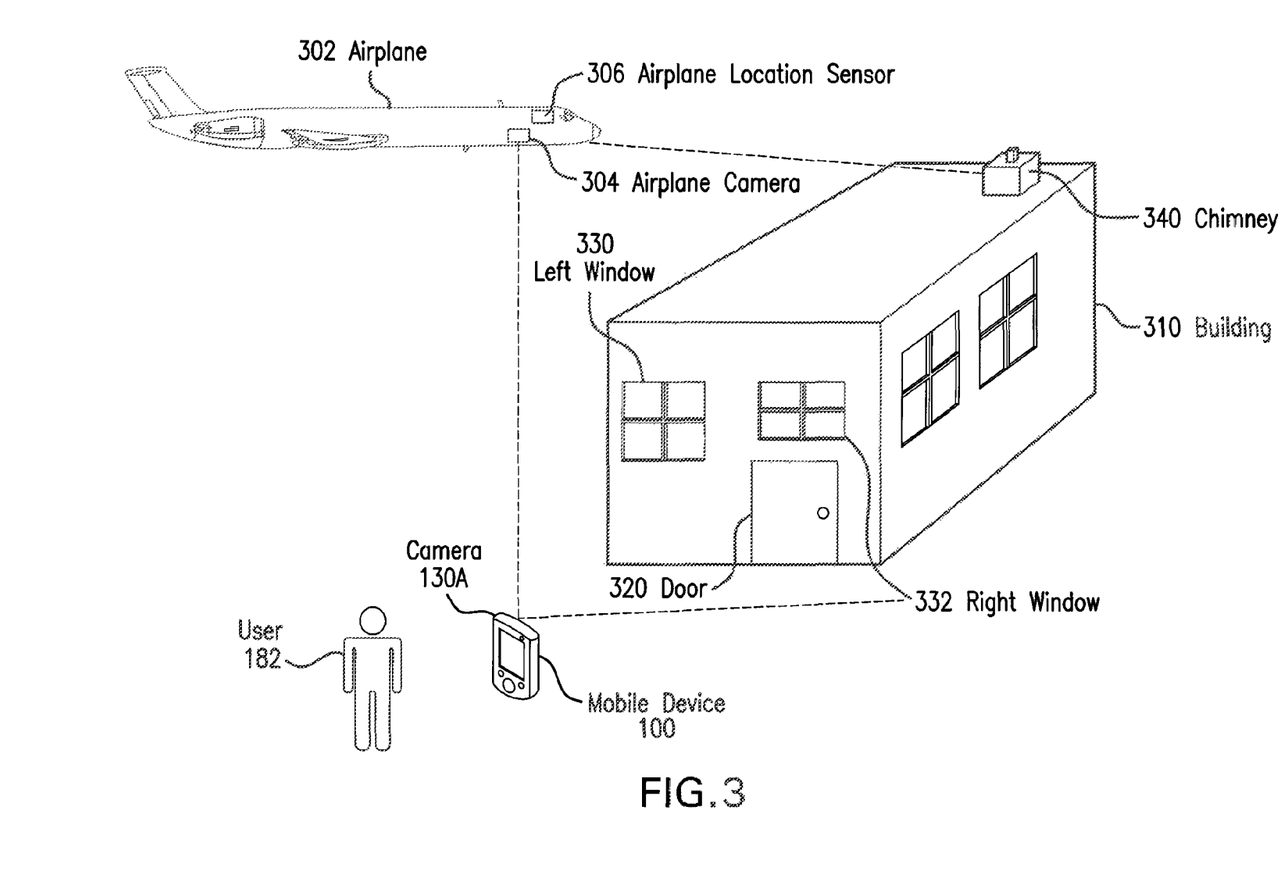
FIG. 3 is a diagram showing how a user and a plane may obtain imagery for use in the context of a three-dimensional model.

FIG. 3 is a diagram showing how a user and a plane may obtain imagery for use in the context of a three-dimensional model. While in FIG. 3, a user 182 and an airplane 302 are provided as potential photography sources, it should be noted that additional users (not shown) as well as other image sources such as land vehicles and satellites may additionally contribute photographic images.

In FIG. 3, user 182 is positioned near a building 310. Building 310, as may be seen from FIG. 3, is modeled as a rectangular solid, with several distinct faces and a chimney 340. User 182 uses camera 130A coupled to a mobile device to take a picture of building 310 from a frontal perspective. This frontal perspective shows a door 320, a left window 330 and a right window 332, and a chimney 340. This frontal perspective is recorded as a local photograph 400 (see FIG. 4), discussed below.

Additionally, an airplane 302 flies over building 310. It uses an airplane camera 304 to take an overhead photograph of building 310 as remote photo 500 (see FIG. 5). Airplane 302 provides an overhead perspective of chimney 340. Airplane 302 may also include an airplane location sensor 306 to associate location information with photographs taken by airplane camera 304.

Several pieces of information are recorded when a picture is taken. When a picture is taken, the camera records an image that is a visual reproduction of its field of view. However, when user 182 takes a picture, location sensor 150 records information for a camera model that subsequently provides server photogrammetry module 160 with context related to the picture. The camera model includes a location and an orientation of the picture. The location information generally consists of a latitude, a longitude, and altitude and provides for a geographical location with which the picture is associated. Alternatively, the location information may be specified in relationship to geographical features (i.e. street names or landmarks.) The orientation reflects the position of the camera with respect to gravity, and helps provide information about where the top and bottom of the photograph are located. This camera model information helps provide server photogrammetry module 160 with an initial guess about how images should be positioned to integrate them into the 3D model. In general, the camera model suggests an initial placement and orientation of photographs that server photogrammetry module 160 can use. By taking advantage of overlap between multiple photographs, camera models and photogrammetry modules can use information from multiple photographs and multiple camera models to fill in gaps from other photographs and camera models.

Figure 4:
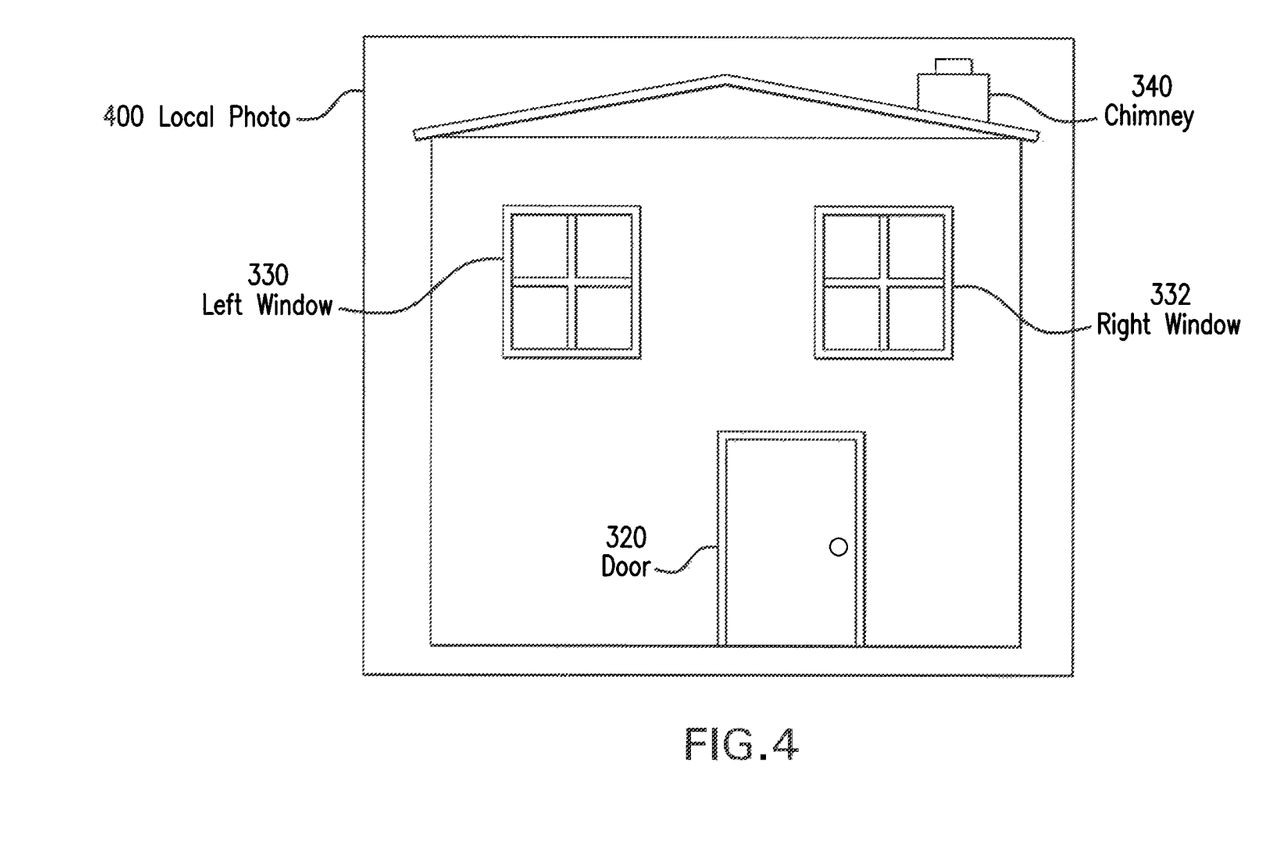
FIG. 4 is an example local photo, taken facing the front of a building.

FIG. 4 is an example local photo, taken facing the front of a building. FIG. 4 shows a façade of building 310, including a door 320, two windows, left window 330 and right window 332, and a chimney 340. The façade is displayed as a local photo 400. Local photo 400 may be taken, for example, as in FIG. 3 by user 182 using camera 130A when they are positioned in front of building 310. Additionally, local photo may be associated with a camera model provided by location sensor 150 that is coupled to mobile device 100. As discussed above, this camera model would provide for the location and orientation of the camera which was used to take the photograph. In this case, it would indicate the location of user 182, and that the camera was pointed directly at building 310, with the top of the building at the top of the picture. This camera model information can then be processed appropriately by server photogrammetry module 160 or mobile photogrammetry module 144 to integrate the photo into the 3D model at 3D model application 136. By default, the camera model would provide for mapping the photo onto the front façade of building 310, based on the location and orientation associated with camera 130A when the picture was taken.

Figure 5:
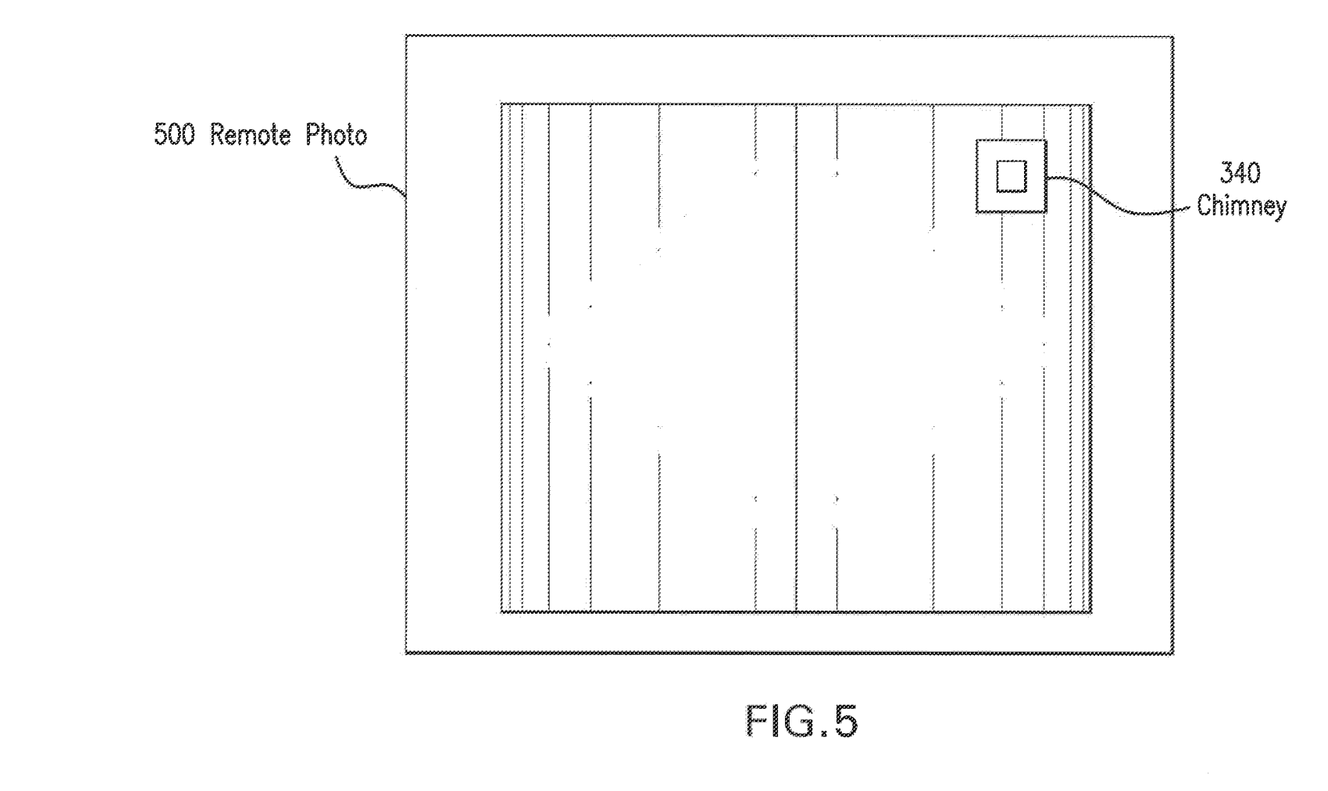
FIG. 5 is an example remote photo, taken flying over a building.

FIG. 5 is an example remote photo, taken flying over a building. FIG. 5 shows an overhead remote photo 500 view of the roof for building 310, including an overhead view of chimney 340. As noted previously, the remote photo may provide for an alternative view of the subject of local photo 400. In the case of remote photo 500, airplane 302 obtains the photo, and airplane location sensor 306 provides camera model information that can suggest to a server photogrammetry module 160 or mobile photogrammetry module 144 how to integrate the photo into the 3D model at 3D model application 136. In this case, it would be appropriate to map the remote photo onto the top of building 310, because airplane location sensor would indicate that the photo was taken from above the building and it was oriented looking down.

Figure 6:
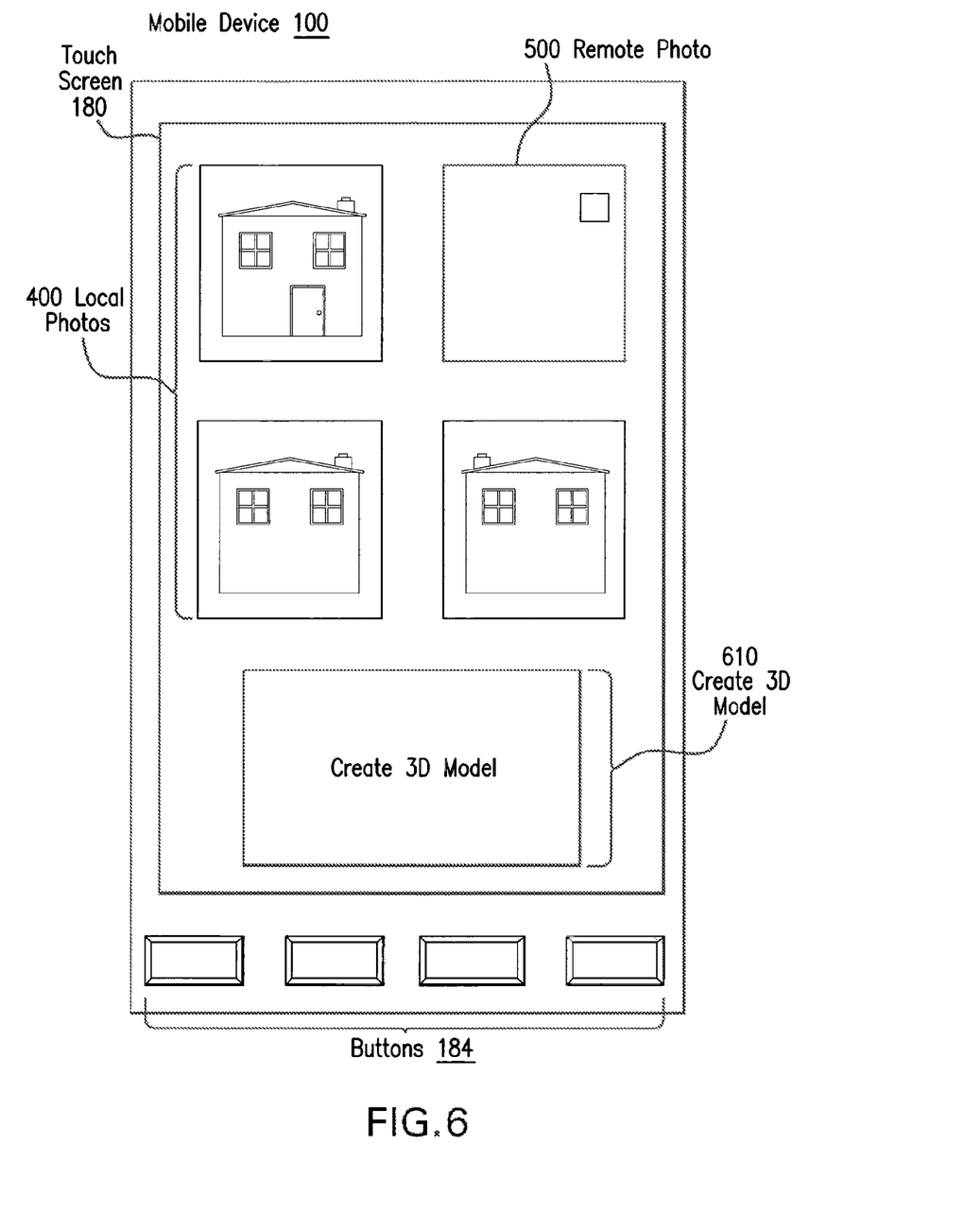
FIG. 6 is a screenshot of a mobile device interface that allows a user to organize views of a building to be transformed into a three-dimensional model.

FIG. 6 is a screenshot of a mobile device interface that allows a user to organize views of a building to be transformed into a three-dimensional model. For example, a variety of local photos 400 and a remote photo 500 that show ground-based views and an overhead view of building 310 are displayed on touch screen 180. These photos can be selected for manipulation as in FIGS. 8 and 9 to set constraints that govern how the photos are aligned with respect to the 3D model. Mobile device 100 additionally includes buttons 184 that a user 182 may use to interact with the views, as well as a create 3D model button control 610 that user 182 may use on touch screen 180 to create the three-dimensional model. While the button control 610 is depicted as a touch screen 180 button, it may be a physical button as well. Similarly, physical buttons 184 may have functionality that allow user 182 to navigate and control the mobile device 100 interface, but these physical buttons 184 may additionally be provided for as button controls on the touch screen 180. The buttons 184 may include functionality such as activating a menu, navigating to a prior screen, navigating to a home screen, or performing a search, in various embodiments.

Figure 7:
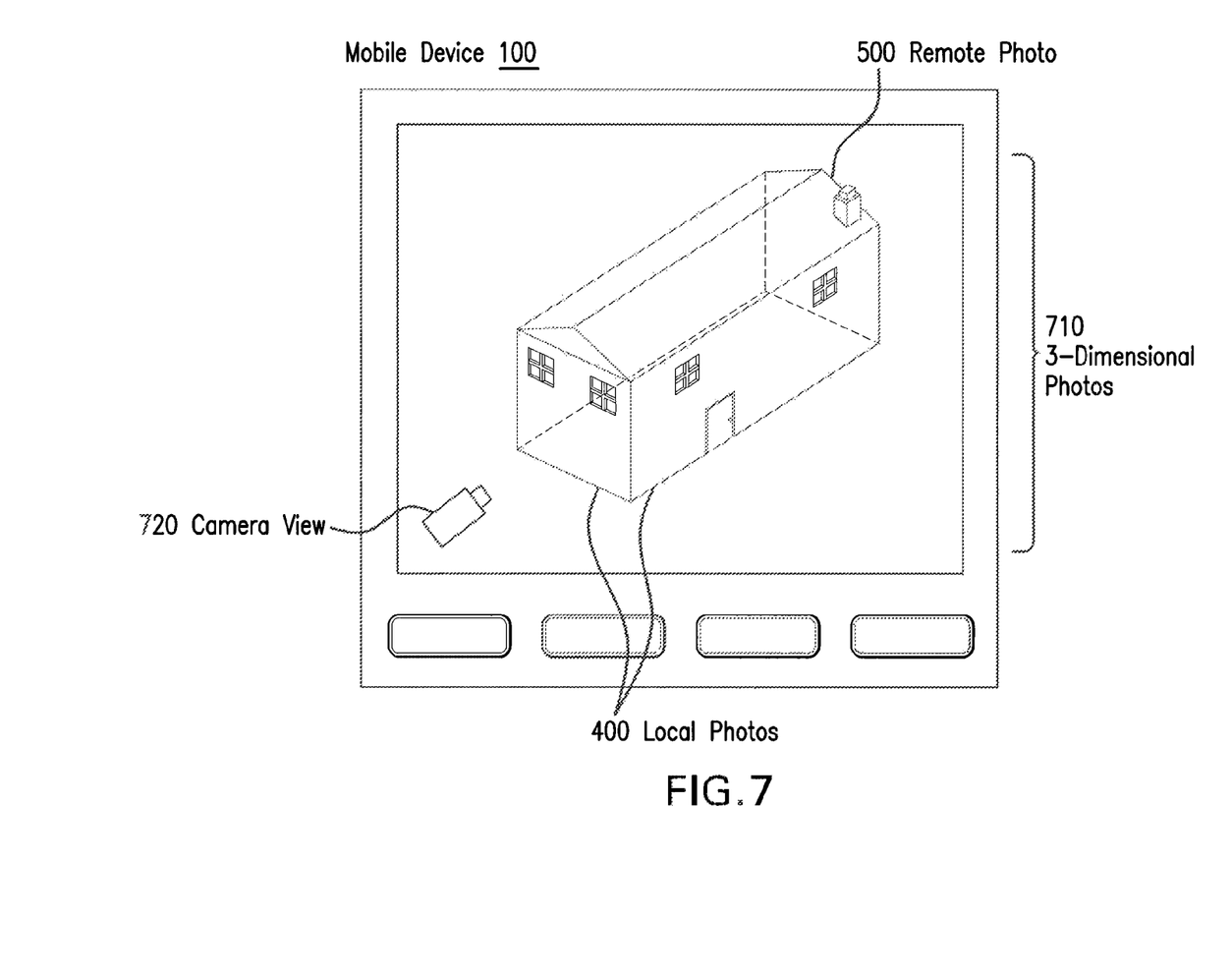
FIG. 7 is a screenshot illustrating a three-dimensional model that results after mapping various two-dimensional views onto the sides of a three-dimensional solid model.

FIG. 7 is a screenshot of an interactive three-dimensional model that results after mapping various two-dimensional views onto the sides of a three-dimensional solid model 710. Three-dimensional solid model 710 is a graphic of a three-dimensional model that represents a rectangular prism onto which local photos 400 and a remote photo 500 have been texture mapped. A camera 720 may be manipulated by the user to control how three-dimensional model 710 is viewed. User 182 may use touch screen 180 to navigate the three-dimensional model 710.

In some embodiments, camera model information used to construct the three-dimensional model may include information about a viewing angle of the camera when the camera took the photographic image and a focal length of the camera. Such information may be of help in allowing server photogrammetry module 160 or mobile photogrammetry module 144 to integrate the photo into the 3D model at 3D model application 136 by aiding in making initial guesses about how to position the images for texture mapping in the context of photogrammetry.

Referring back to FIG. 1, touch screen 180 may offer a variety of input options to user 182. For example, it may offer multitouch input. Such multitouch input may include gestures such as pinching and swiping, to perform features such as zooming and rotating. In general, touch screen 180 may allow users to touch discrete points, or may allow for gestures with a moving point of contact in order to obtain input to navigate the three-dimensional model 710.

In general, the three-dimensional model provides two-dimensional views of the three-dimensional model, if touch screen 180 is a standard two-dimensional touch screen 180. However, as discussed below in connection with FIGS. 10A and 10B, some embodiments provide for stereo photography and 3D screens that provide a three-dimensional effects in conjunction with the 3D model.

Various input from the touch screen allows the user to navigate 3D model 710. By performing various single-touch and multi-touch gestures, touch screen 180 allows various navigation actions including rotation, translation, revolution, and zooming. Additionally, various gestures allow control over the model including establishing a position of the three-dimensional model, a scale of a plurality of axes of the three-dimensional model, and an orientation of the three-dimensional model. In general, these changes can be made by touch or multi-touch gestures, including combinations of single-point touches, swipes, pinches, and multi-touch gestures incorporating an anchored finger and a swiping finger.

Figure 8:
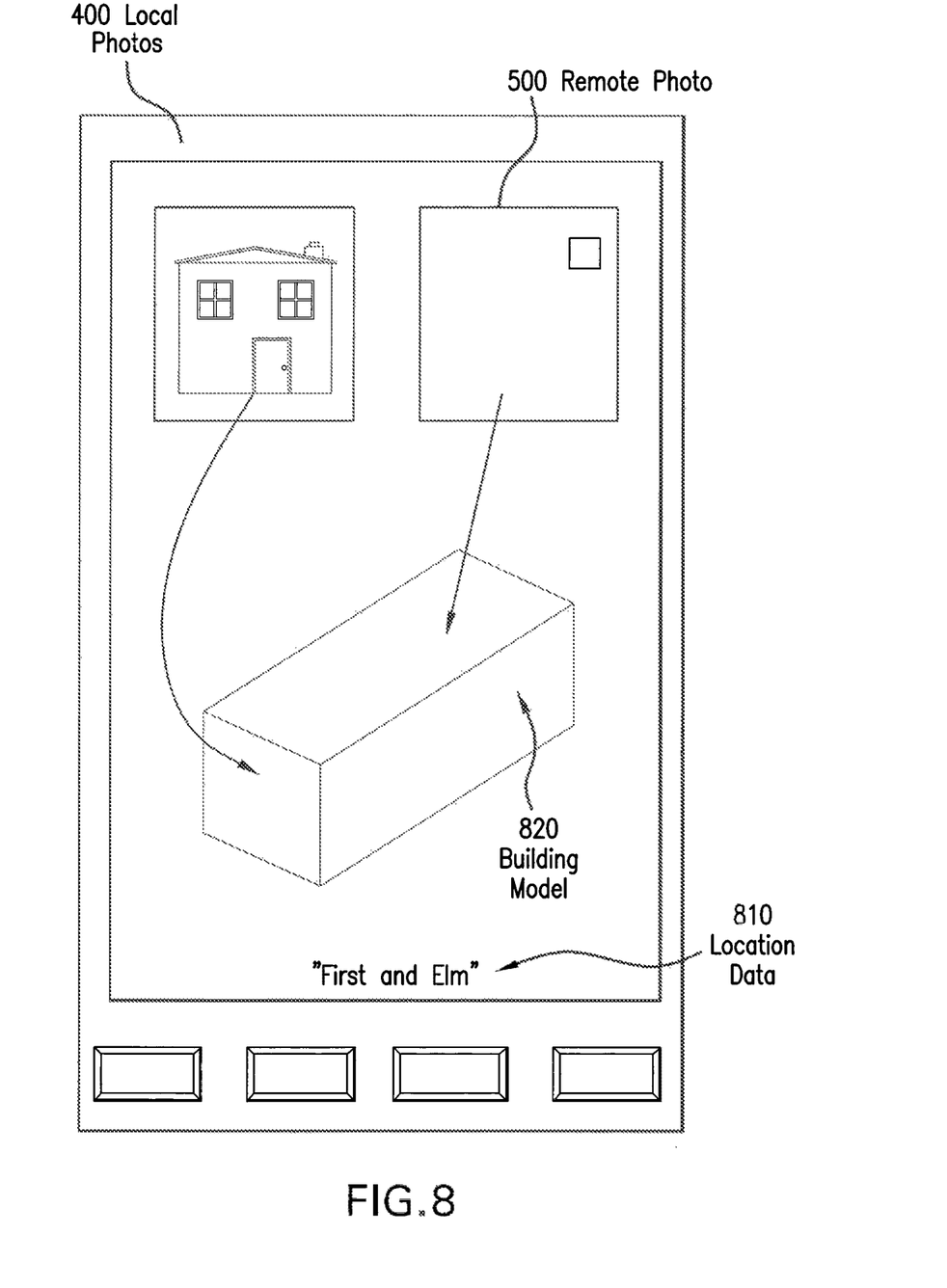
FIG. 8 is a screenshot that shows how various two dimensional images may be dragged onto the side of a three-dimensional solid to texture map them onto the sides of the solid.

FIG. 8 is a screenshot that shows how various two dimensional images may be dragged onto the side of a three-dimensional solid to texture map them onto the sides of the solid. In FIG. 8, touch screen 180 displays location data 810, such as "First and Elm", that is associated with the model. In this case, "First and Elm" is descriptive of a street intersection that provides for the location of a building model that helps select relevant images to map onto the building model 820, which in this case is a rectangular prism. In this case, remote photo 500 have selected because it is also associated as being located at "First and Elm". Local photo 400 represents a façade of one side of the rectangular solid of building model 820, while remote photo 500 represents an overhead view. By using touch screen 180, user 182 may tap local photo 400 and then tap a front side of building model 820 to associate the local photo with that side, or alternatively may swipe a finger from the location of local photo 400 to the front side of building model 820 to associate local photo 400 with the front side. Similar touch screen 180 input may be used to associate the remote photo 500 with the top side of building model 820. Alternatively, the camera models associated with local photo 400 and remote photo 500 may be used to correlate to respective facades.

Figure 9:
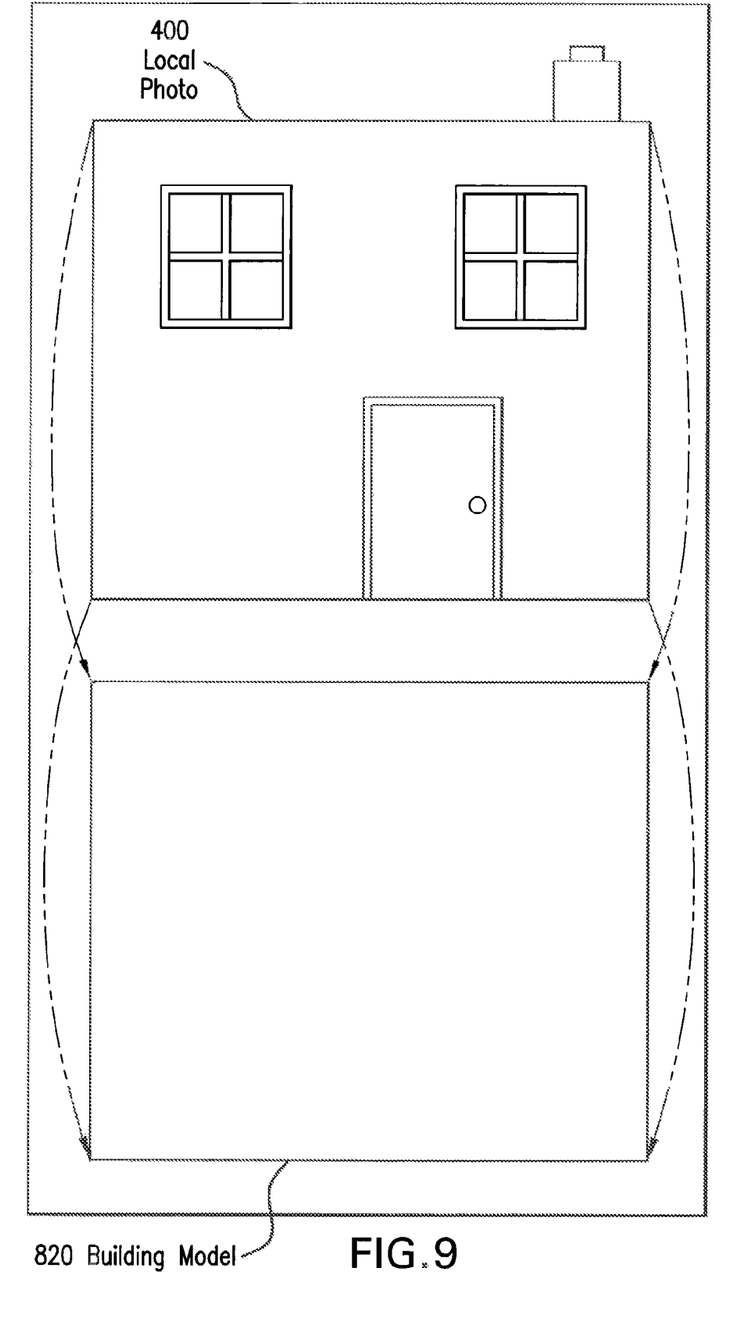
FIG. 9 is a screenshot that shows how the corners of a two-dimensional image may be mapped onto the corners of a three-dimensional solid to provide for texture mapping the two-dimensional image onto the solid.

FIG. 9 is a screenshot that shows how the corners of a building in a two-dimensional image may be mapped onto the corners of a three-dimensional solid to provide constraints. Such mapping provides for more fine-tuned control over associating local image 400 with building model 820. By altering how the building model is constrained to locations in the photos, photogrammetry may be used to update the geometry of the three dimensional model (and possibly also the camera models associated with the photos.)

Figure 10A:
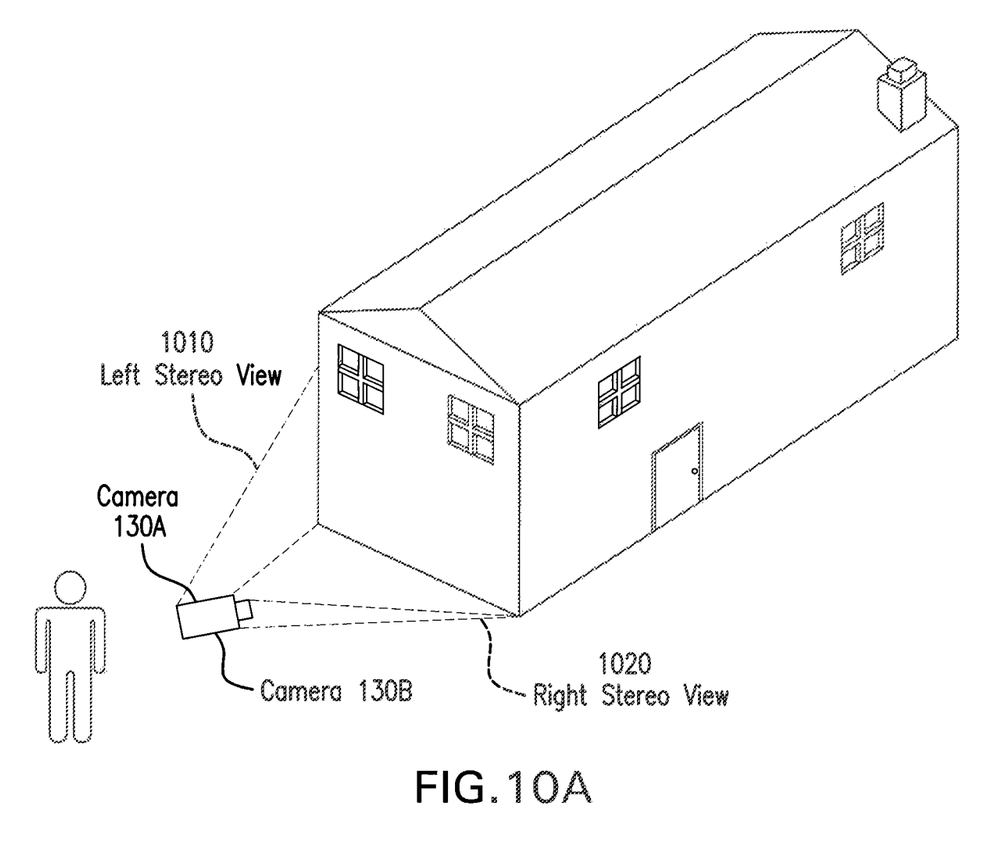
FIG. 10A illustrates how stereo cameras may be used to obtain 3D photography.
Figure 10B:
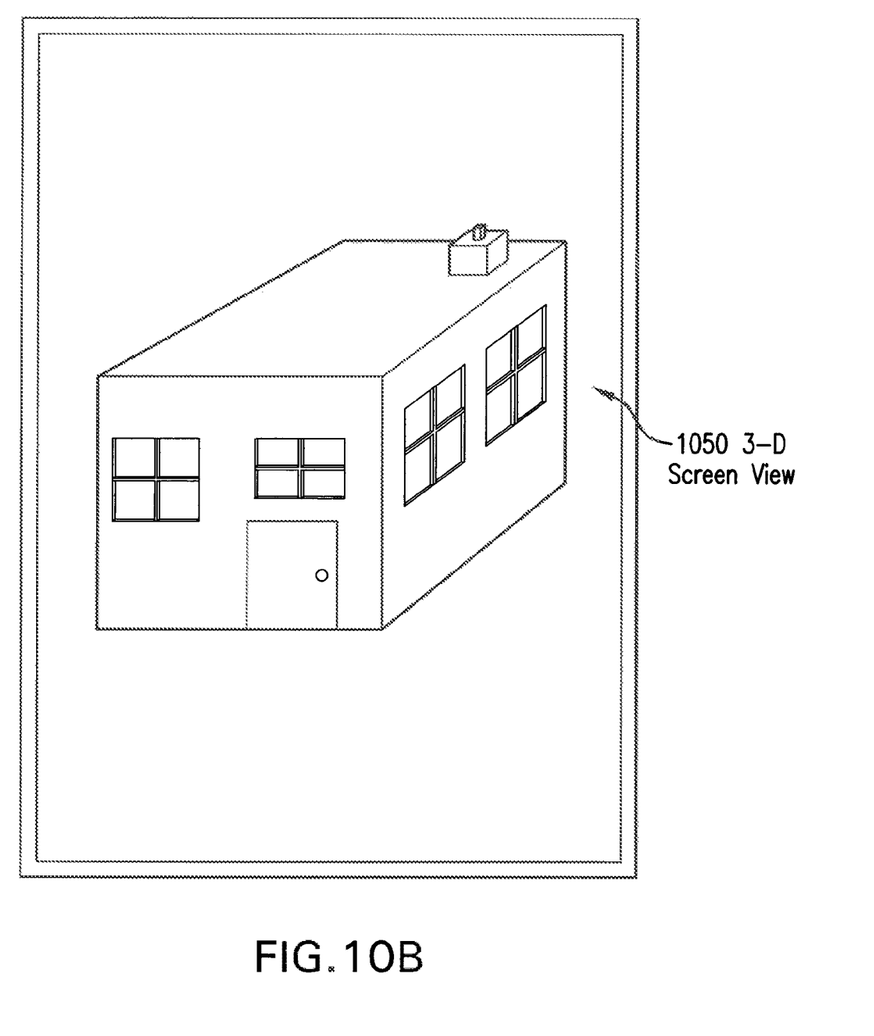
FIG. 10B illustrates how a 3D model may be depicted on a 3D screen.

FIG. 10A illustrates how stereo cameras may be used to obtain 3D photography, and FIG. 10B illustrates how a 3D model may be depicted on a 3D screen. In FIG. 10A, camera 130A obtains a left stereo view 1010 and camera 130B obtains a right stereo view 1020. Together, the stereo photography may be combined to yield a three-dimensional perspective for building views. Such a three-dimensional perspective may be portrayed on a three-dimensional screen as a 3D screen view 1050. Such a 3D screen view may require the use of special glasses to support a 3D view, or may use appropriate screen technologies to lend the screen a 3D aspect without requiring glasses. 3D screens use special optical effects to provide the illusion of depth, and can allow users to perceive the 3D model as being genuinely three-dimensional, rather than a projection onto a two-dimensional screen, as in other embodiments.

Figure 11:
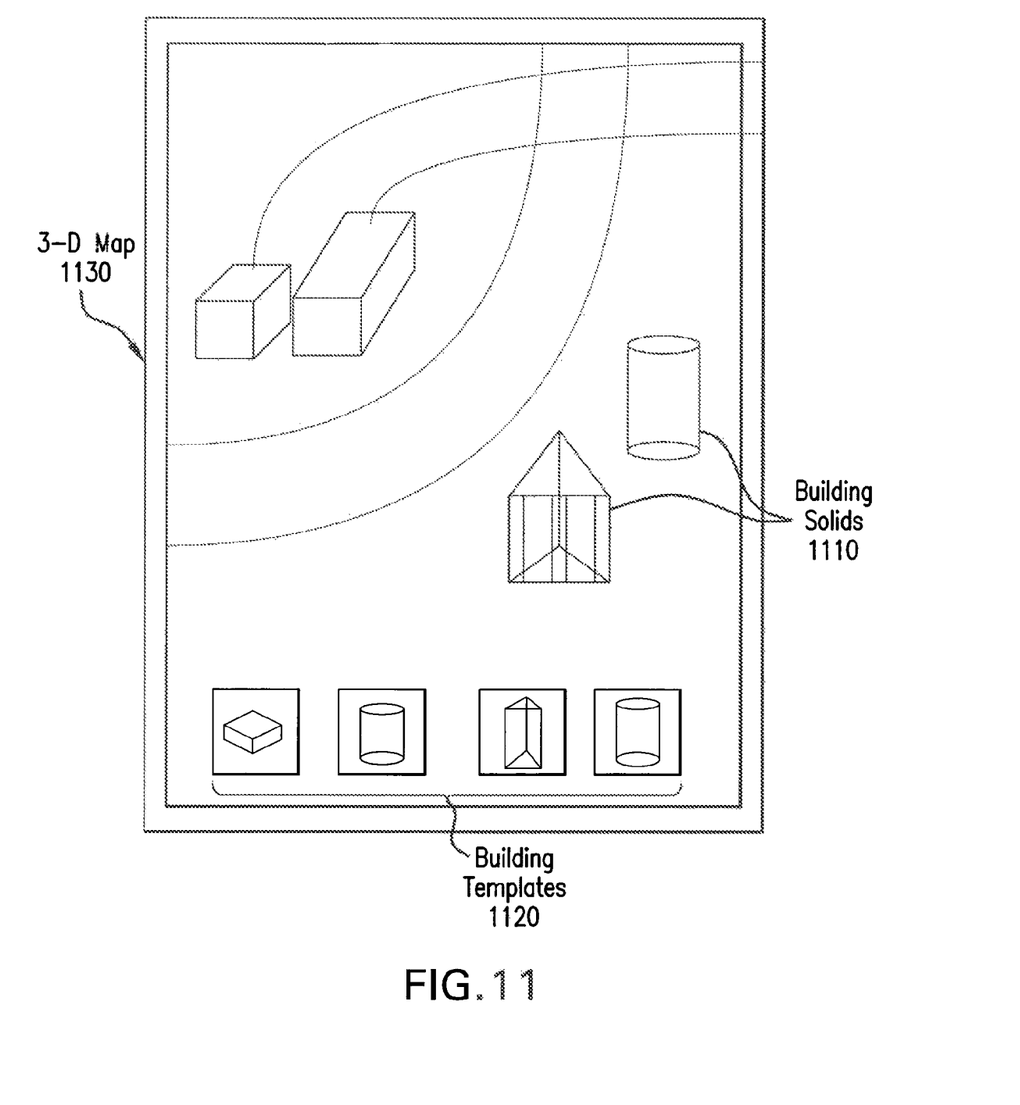
FIG. 11 illustrates an interface for a building modeler, in an embodiment.

FIG. 11 illustrates an interface for a building modeler, in an embodiment. The building modeler allows the user to alter the model by defining solids. In the building modeler, building templates 1120 buttons provide example shapes that may be dragged onto 3D map 1130 by using appropriate touch screen 180 gestures. The building templates 1120 allow the user to place building solids 1110 by tapping locations on 3D map or by swiping from the building template 1120 button to the desired location. Then, the user may use appropriate gestures to perform manipulations on the building solids, such as rotation, translations, resizing, reflection and so on. Once the user has constructed a 3D map 1130 by using building modeler, the 3D model may have images mapped onto it as in FIG. 7.

Thus, embodiments incorporate a variety of features in new and advantageous ways. Embodiments provide for easily obtaining images using cameras coupled to a mobile device. As the images are obtained, camera model information is associated with them. The camera model information may include information including the orientation and location of the cameras. Embodiments combine local images with additional images that have fields of view that overlap with the local images and also have camera model information. To provide more information to allow photogrammetry functionality (that may be provided at the mobile device, in a front-end implementation, or at a server, in a back-end implementation), the user can show where points on the images map to points on three-dimensional models.

By combining the information from the camera models and the user-set points, photogrammetry algorithms at the front-end or the back-end texture map the images onto solids which represent buildings on a map. Similarly, images may be mapped onto walls indoors, in some embodiments. Given a sufficient set of images, the front-end or the back-end can obtain coverage for all surfaces in a field of view, providing a user with access to a 3D simulation of a virtual environment based on the photogrammetry. Additionally, stereophotography and a 3D screen in some embodiments may offer a true 3D representation of the model.

Thus, embodiments represent an effective way of obtaining and organizing image data which is representative of an area, and combining the data to provide and alter a 3D simulation of the area.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for altering three-dimensional models based on two-dimensional images, comprising:
   (a) capturing, with a first camera of a mobile device, a local photographic image with a first field of view;
   (b) detecting, using information from a location sensor associated with the mobile device, a first location and a first orientation of the first camera when the local photograph was captured in (a), wherein a first camera model includes the first location and the first orientation;
   (c) sending a request to a server, separate from the mobile device, for an additional photographic image captured from a second camera remote from the mobile device, the additional photographic image having a second field of view overlapping with the first field of view;
   (d) receiving, from the server, the additional photographic image and a second camera model including a location and an orientation of the second camera when the additional photographic image was captured;
(e) receiving a user constraint input by a user of the mobile device to be applied within a three-dimensional model, the user constraint associating an image position on the local photographic image with a corresponding position within the three-dimensional model; and
(f) applying a photogrammetry algorithm to alter the three-dimensional model based, at least in part on, the first and second camera models and the user constraint such that the local photographic image is integrated into the three-dimensional model in a manner that locates the image position at the corresponding position within the three-dimensional model.

2. The method of claim 1, further comprising the steps of:
(g) determining whether the user wants to add another constraint; and
(h) when the user wants to add more constraints as determined in (g), repeating the receiving and the applying with respect to the additional constraint.

3. The method of claim 1, further comprising using a touch screen coupled to the mobile device to accept touch screen input from the user that allows the user to navigate through the three-dimensional model after it has been altered, wherein the touch screen allows multitouch input to navigate the three-dimensional model.

4. The method of claim 3, wherein the touch screen allows the user to use gestures involving a moving point of contact to navigate the three-dimensional model.

5. The method of claim 3, wherein the touch screen input controls a navigation camera view of the three-dimensional model that provides a two-dimensional view of the three-dimensional model, wherein the touch screen allows one or more of rotation, translation, revolution, and zooming by the navigation camera view with respect to the three-dimensional model.

6. The method of claim 1, wherein the camera model for each camera further comprises a viewing angle of the camera when the camera took the photographic image and a focal length of the camera, the viewing angle and focal length information being used in the altering of the three-dimensional model.

7. The method of claim 1, further comprising displaying the three-dimensional model on a three-dimensional display coupled to the mobile device.

8. The method of claim 1, wherein the user constraint is applied to a set of images that constitute stereo photography such that at least one image position for the set of images is associated with at least one corresponding position within the three-dimensional model.

9. The method of claim 1, wherein at least steps (c)-(f) are carried out by an application on the mobile device, the application separate from a web browser on the mobile device.

10. A system for altering three-dimensional models based on two-dimensional images the system comprising:
a mobile device including a first camera configured to capture a local photographic image with a first field of view and a location sensor configured to capture a first location and a first orientation of the first camera when the local photographic image is captured, wherein a first camera model includes the first location and the first orientation, the mobile device further including one or more processors and associated memory, the memory storing instructions that, when implemented by the one or more processors, configure the mobile device to implement:
a server image request module, configured to send a request to a server, separate from the mobile device, for an additional photographic image captured from a second camera remote from the mobile device, the additional photographic image having a second field of view overlapping with the first field of view;
a server image receipt module configured to receive, from the server, the additional photographic image and a second camera model including a location and an orientation of the second camera when the additional photographic image was captured;
a user constraint input module configured to receive a user constraint input by a user of the mobile device to be applied within a three-dimensional model, the user constraint associating an image position on the local photographic image with a corresponding position within the three-dimensional model; and
a photogrammetry module configured to apply a photogrammetry algorithm to alter the three-dimensional model based, at least in part on, the first and second camera models and the user constraint such that the local photographic image is integrated into the three-dimensional model in a manner that locates the image position at the corresponding position within the three-dimensional model.

11. The system of claim 10, wherein the user constraint input module and photogrammetry module are further configured to determine whether the user wants to add more user constraints.

12. The system of claim 10, further comprising a touch screen coupled to the mobile device configured to accept touch screen input from the user that allows the user to navigate through the three-dimensional model after it has been altered, wherein the touch screen allows multitouch input to navigate the three-dimensional model.

13. The system of claim 12, wherein the touch screen allows the user to use gestures involving a moving point of contact to navigate the three-dimensional model.

14. The system of claim 12, wherein the touch screen input controls a navigation camera view of the three-dimensional model that provides a two-dimensional view of the three-dimensional model, wherein the touch screen allows one or more of rotation, translation, revolution, or zooming by the navigation camera view with respect to the three-dimensional model.

15. The system of claim 10, wherein the camera model for each camera further comprises a viewing angle of the camera when the camera took the photographic image and a focal length of the camera, the viewing angle and focal length information being used in the altering of the three-dimensional model.

16. The system of claim 10, further comprising a three-dimensional display coupled to the mobile device configured to display the three-dimensional model.

17. The system of claim 10, further comprising:
at least one application, on the mobile device, that includes the server image request module, the server image receipt module, the user constraint input module, and the photogrammetry module; and
a web browser on the mobile device that is separate from the at least one application.

18. A non-transitory computer readable storage medium having instructions stored thereon that, when executed by one or more processors, cause the one or more processors to execute a method for altering three-dimensional models based on two-dimensional images, the method comprising:

(a) capturing, with a first camera of a mobile device, a local photographic image with a first field of view;
(b) detecting, using information from a location sensor associated with the mobile device, a first location and a first orientation of the first camera when the local photograph was captured in (a), wherein a first camera model includes the first location and the first orientation;
(c) sending a request to a server, separate from the mobile device, for an additional photographic image captured from a second camera remote from the mobile device, the additional photographic image having a second field of view overlapping with the first field of view;
(d) receiving, from the server, the additional photographic image and a second camera model including a location and an orientation of the second camera when the additional photographic image was captured;
(e) receiving a user constraint input by a user of the mobile device to be applied within a three-dimensional model, the user constraint associating an image position on the local photographic image with a corresponding position within the three-dimensional model; and
(f) applying a photogrammetry algorithm to alter the three-dimensional model based, at least in part on, the first and second camera models and the user constraint such that the local photographic image is integrated into the three-dimensional model in a manner that locates the image position at the corresponding position within the three-dimensional model.

19. The non-transitory computer readable storage medium of claim 18, wherein the camera model for each camera further comprises a viewing angle of the camera when the camera took the photographic image and a focal length of the camera, the viewing angle and focal length information being used in the altering of the three-dimensional model.

20. The non-transitory computer readable storage medium of claim 18, wherein at least steps (c)-(f) are carried out by an application on the mobile device, the application separate from a web browser on the mobile device.

\* \* \* \* \*